(12) United States Patent
Fukue et al.

(10) Patent No.: US 11,783,151 B2
(45) Date of Patent: Oct. 10, 2023

(54) IMAGE FORMING APPARATUS

(71) Applicant: BROTHER KOGYO KABUSHIKI KAISHA, Nagoya (JP)

(72) Inventors: Shuhei Fukue, Nagoya (JP); Shunsuke Ueki, Nagoya (JP); Shintaro Sakaguchi, Nagoya (JP); Yusuke Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/529,810

(22) Filed: Nov. 18, 2021

(65) Prior Publication Data
US 2022/0164614 A1 May 26, 2022

(30) Foreign Application Priority Data

Nov. 20, 2020 (JP) .................................. 2020-193054

(51) Int. Cl.
| | | |
|---|---|---|
| *G06F 15/00* | (2006.01) | |
| *G06K 15/00* | (2006.01) | |
| *G06K 15/16* | (2006.01) | |
| *G03G 15/20* | (2006.01) | |
| *G06K 15/02* | (2006.01) | |

(52) U.S. Cl.
CPC ..... *G06K 15/4065* (2013.01); *G03G 15/2028* (2013.01); *G06K 15/002* (2013.01); *G06K 15/021* (2013.01); *G06K 15/16* (2013.01); *G06K 15/1805* (2013.01); *G06K 15/408* (2013.01)

(58) Field of Classification Search
CPC ............ G06K 15/4065; G06K 15/002; G06K 15/021; G06K 15/16; G06K 15/1805; G06K 15/408; G03G 15/2028
USPC ....................................................... 358/1.12
See application file for complete search history.

(56) References Cited

U.S. PATENT DOCUMENTS

2012/0148280 A1  6/2012 Sato

FOREIGN PATENT DOCUMENTS

| JP | 2006-235551 A | 9/2006 |
|---|---|---|
| JP | 2007-72366 A | 3/2007 |
| JP | 2007-78949 A | 3/2007 |
| JP | 2012-128102 A | 7/2012 |

*Primary Examiner* — Mark R Milia
(74) *Attorney, Agent, or Firm* — Merchant & Gould P.C.

(57) ABSTRACT

An image forming apparatus includes a roller, a heater configured to heat the roller, an endless belt, a nip forming member, a supply roller configured to supply a sheet, and a controller. The sheet is nipped between the endless belt and the roller. The endless belt is nipped between the nip forming member and the roller such that a nip portion is formed. The controller is configured to supply a plurality of first kind of sheets by the supply roller at a first interval when the plurality of first kind of sheets are sequentially conveyed and supply a plurality of second kind of sheets by the supply roller at a second interval greater than the first interval when the plurality of second kind of sheets belonging to a kind in which curl occurs more frequently than the plurality of first kind of sheets are sequentially conveyed.

15 Claims, 8 Drawing Sheets

IMAGE FORMING APPARATUS

CROSS REFERENCE TO RELATED APPLICATION

The present application claims priority from Japanese Patent Application No. 2020-193054, which was filed on Nov. 20, 2020, the disclosure of which is herein incorporated by reference in its entirety.

BACKGROUND

The following disclosure relates to an image forming apparatus including a fixing device that fixes a toner image on a sheet.

There has been known an image forming apparatus including a fixing belt stretched by a heating roller and a support roller, and a pressure roller. The fixing belt is nipped between the pressure roller and the support roller. The image forming apparatus suppresses curl of the sheets by adjusting a conveying interval of the sheet based on humidity and temperature.

SUMMARY

Incidentally, in a structure in which a pressure unit, in which the sheet is nipped between the pressure unit and the heating roller, includes an endless belt and a pad in which the endless belt is nipped between the heating roller and the pad, a heat capacity of the pressure unit is small; therefore, the temperature in the pressure unit tends to decrease when a plurality of sheets are continuously printed. Accordingly, a temperature difference between the heating roller and the pressure unit increases and the curl of the sheet becomes large at the time of continuous printing, and there is a possibility of causing a problem that the sheet is easily wound around the heating roller depending on the kind of the sheet. Such problem may occur regardless of temperature or humidity.

In view of the above, an aspect of the disclosure relates to an image forming apparatus capable of suppressing the curl regardless of the kind of the sheet.

In one aspect of the disclosure, an image forming apparatus includes a roller, a heater configured to heat the roller, an endless belt, a nip forming member, a supply roller configured to supply a sheet, and a controller. The sheet is nipped between the endless belt and the roller. The endless belt is nipped between the nip forming member and the roller such that a nip portion is formed. The controller is configured to supply a plurality of first kind of sheets by the supply roller at a first interval when the plurality of first kind of sheets are sequentially conveyed, and the first sheet interval is a sheet interval between an upstream end of a preceding sheet of the plurality of first kind of sheets in a conveying direction of the sheet and a downstream end of a subsequent sheet of the plurality of first kind of sheets in the conveying direction. The controller is configured to supply a plurality of second kind of sheets by the supply roller at a second interval greater than the first interval when the plurality of second kind of sheets belonging to a kind in which curl occurs more frequently than the plurality of first kind of sheets are sequentially conveyed, and the second interval is a sheet interval between an upstream end of a preceding sheet of the plurality of second kind of sheets in the conveying direction to a downstream end of a subsequent sheet of the plurality of second kind of sheets in the conveying direction.

In another aspect of the disclosure, an image forming apparatus includes a roller, a heater configured to heat the roller, an endless belt, a nip forming member, a supply roller configured to supply a sheet; and a controller. The sheet is nipped between the endless belt and the roller, and the endless belt is nipped between the nip forming member and the roller such that a nip portion is formed. The controller configured to set a time interval at which a plurality of first kind of sheets are supplied by the supply roller to a first time interval when the plurality of first kind of sheets are sequentially conveyed, and set a time interval at which a plurality of second kind of sheets are supplied by the supply roller to a second time interval greater than the first time interval when the plurality of second kind of sheets belonging to a kind in which curl occurs more frequently than the plurality of first kind of sheets are sequentially conveyed.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment of the present disclosure will be explained in detail suitably with reference to the drawings.

Figure 1:
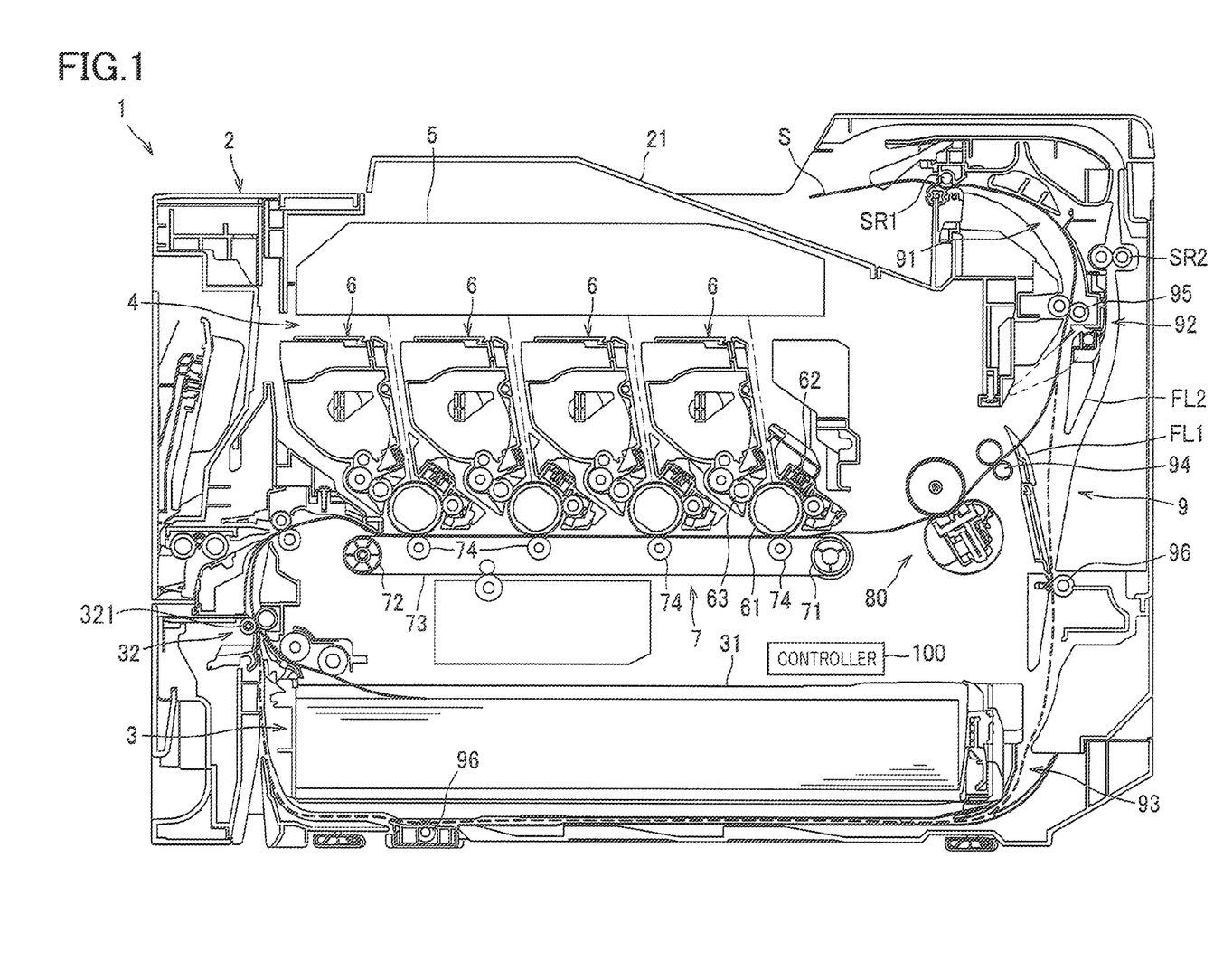
FIG. 1 is a cross-sectional view illustrating a color printer according to an embodiment of the present disclosure.

As illustrated in FIG. 1, a color printer 1 as an example of an image forming apparatus includes a body housing 2, a supplier 3 disposed inside the body housing 2, an image forming unit 4, a fixing device 80, and a conveying unit 9, and a controller 100.

The body housing 2 includes an output tray 21 on an upper surface.

The supplier 3 includes a supply tray 31 and a supply mechanism 32. The supply tray 31 is provided at a lower part in the body housing 2 and accommodating a sheet S. The supply mechanism 32 includes a supply roller 321 and configured to supply the sheet S in the supply tray 31 to the image forming unit 4 by the supply roller 321.

The image forming unit 4 has a function of forming an image by transferring a toner image on the sheet S, and includes an exposing device 5, four process cartridges 6, and a transfer unit 7.

The exposing device 5 is disposed at an upper part in the body housing 2, and includes a light source, a polygon mirror, and the like which are not illustrated. The exposing device 5 exposes surfaces of photoconductive drums 61 by scanning the surfaces of the photoconductive drums 61 with a light beam at high speed.

Each of the four process cartridges 6 includes the photoconductive drum 61, a charging unit 62, a developing roller 63. In each of the four process cartridges 6, toner of respective colors which are yellow, magenta, cyan, and black are contained.

The transfer unit 7 includes a drive roller 71, a driven roller 72, a conveying belt 73, and four transfer rollers 74. The conveying belt 73 is an endless belt, which is wound around the drive roller 71 and the driven roller 72. The conveying belt 73 is held and interposed between each of the transfer rollers 74 disposed inside the conveying belt 73 and a corresponding one of the photoconductive drums 61.

The charging units 62 charge the surfaces of the photoconductive drums 61. After that, the exposing device 5 exposes the surfaces of the photoconductive drums 61 to form electrostatic latent images on the surfaces of the photoconductive drums 61.

The developing rollers 63 supply toner to the electrostatic latent images formed on the photoconductive drums 61. Accordingly, toner images are formed on the photoconductive drums 61. After that, when the sheet S is conveyed between the photoconductive drums 61 and the transfer rollers 74 by the conveying belt 73, the toner images on the photoconductive drums 61 are transferred onto the sheet S.

The fixing device 80 is a device that heat-fixes the toner image on the sheet S. The details of the fixing device 80 will be described later.

The conveying unit 9 is configured to convey the sheet S discharged from the fixing device 80 to the outside of the body housing 2 or toward the image forming unit 4 again. The conveying unit 9 includes a first conveyance path 91, a second conveyance path 92, a re-conveyance path 93, a first conveying roller 94, a second conveying roller 95, a first switchback roller SR1, a second switchback roller SR2, a plurality of re-conveying rollers 96, and a first flapper FL1 and a second flapper FL 2 which are pivotable.

The first conveyance path 91 is a path guiding the sheet discharged from the fixing device 80 toward the output tray 21. The second conveyance path 92 is a path guiding the sheet discharged from the fixing device 80 toward the output tray 21 through a route different from the first conveyance path 91. The re-conveyance path 93 is a path guiding the sheet S pulled into the body housing 2 by the later-described first switchback roller SR1 and the like to the supply mechanism 32 on an upstream side of the image forming unit 4. The re-conveying roller 96 is a roller configured to convey the sheet S in the re-conveyance path 93 toward the supply mechanism 32, and the re-conveying roller 96 is provided on the re-conveyance path 93.

The first conveying roller 94 is provided at the fixing device 80. The first conveying roller 94 conveys the sheet S on which the toner image is heat-fixed toward the second flapper FL 2.

The second conveying roller 95, the first switchback roller SR1, and the second switchback roller SR2 are rollers which are rotatable forwardly and reversely. The second conveying roller 95, the first switchback roller SR1, and the second switchback roller SR2 convey the sheet S toward the outside of the body housing 2, specifically, toward the output tray 21 at the time of forward rotation, and pull the sheet S into the body housing 2 at the time of reverse rotation.

The second conveying roller 95 and the first switchback roller SR1 are provided at the first conveyance path 91. The first switchback roller SR1 is disposed nearer to the output tray 21 than the second conveying roller 95. The second switchback roller SR2 are provided at the second conveyance path 92.

In the conveying unit 9, since positions of the first flapper FL1 and the second flapper FL 2 are suitably switched, the sheet S can be conveyed from the fixing device 80 toward the first conveyance path 91 or the second conveyance path 92, or the sheet S can be conveyed from the first conveyance path 91 or the second conveyance path 92 to the re-conveyance path 93.

Figure 2:
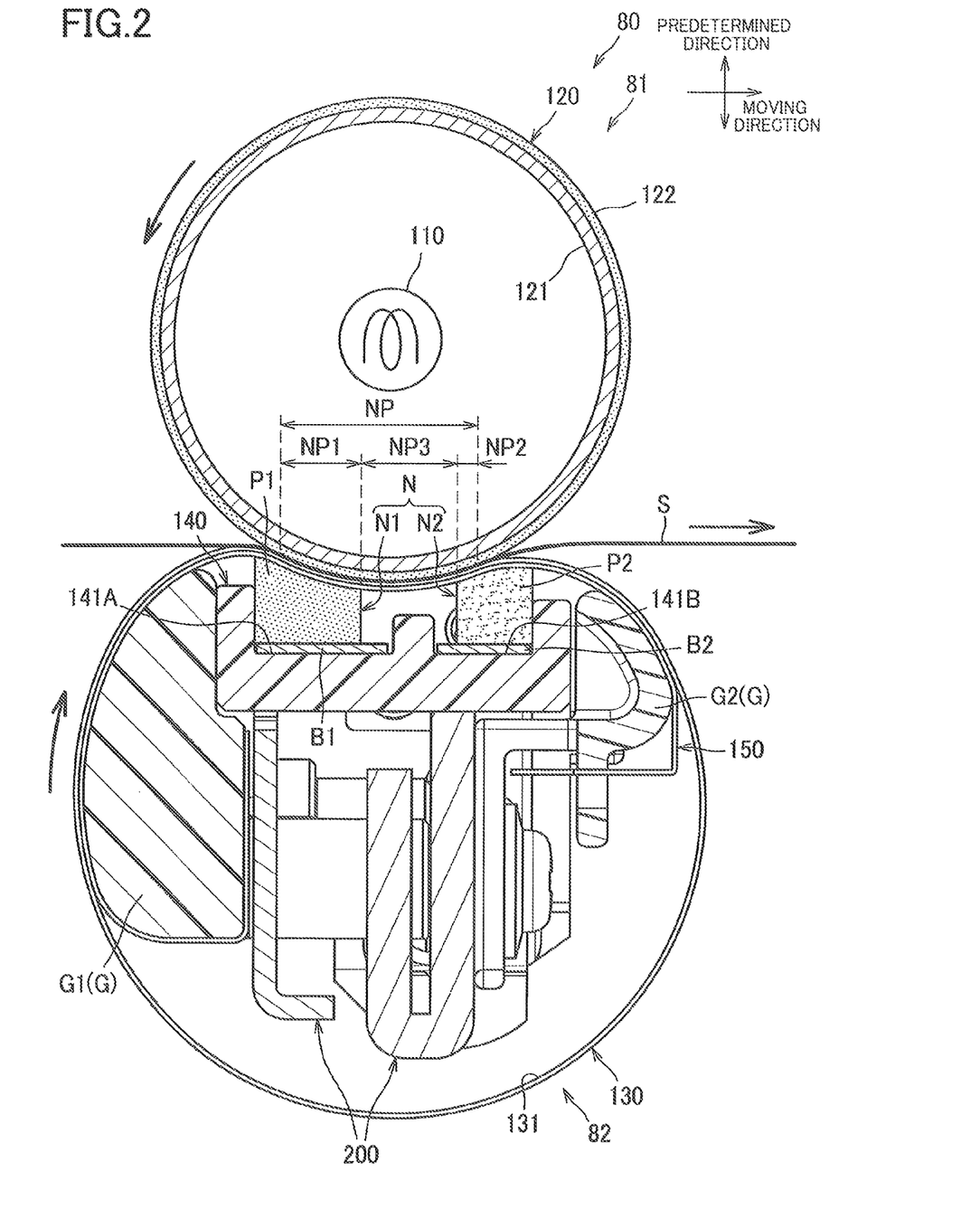
FIG. 2 is a cross-sectional view illustrating a fixing device.

As illustrated in FIG. 2, the fixing device 80 includes a heater 110, a first fixing member 81, and a second fixing member 82. The fixing member 81 includes a roller 120.

The heater 110 is a halogen lamp, and configured to emit light and generate heat by energization, and heat the roller 120 by radiant heat. The heater 110 is disposed so as to extend inside the roller 120 along a rotation axis of the roller 120. Here, a direction along the rotation axis of the roller 120 is an axial direction of the first fixing member 81, and the direction along the rotation axis of the roller 120 will be also refereed to merely as an "axial direction" in the following description.

The roller 120 is a tubular roller and heated by the heater 110. The roller 120 includes a tube blank 121 made of metal or the like and an elastic layer 122 covering an outer circumferential surface of the tube blank 121. The elastic layer 122 is made of rubber such as silicone rubber.

Both end portions of the roller 120 in the axial direction are rotatably supported by a later-described frame FL, specifically, side frames 83 (see FIG. 3), and the roller 120 are driven to rotate in a counterclockwise direction of FIG. 2 when the drive force is inputted from the motor.

The second fixing member 82 is linearly movable in a predetermined direction coming close to/going away from the first fixing member 81. The predetermined direction is orthogonal to the axial direction. The second fixing member 82 is urged toward the first fixing member 81 by a later-described switching mechanism 300 (see FIG. 3).

The second fixing member 82 also includes an endless belt 130, a nip forming member N, a holder 140, a stay 200, a belt guide G, and a sliding sheet 150.

The belt 130 is a member in which the sheet S is nipped between the belt 130 and the roller 120 when the toner image is fixed on the sheet S. The belt 130 is a long tubular member, having flexibility. The belt 130 has a base material made of metal or resin and a mold release layer covering an outer circumferential surface of the base material, though not illustrated. The belt 130 is driven to be rotated in a clockwise direction of FIG. 2 by friction with respect to the roller 120 or the sheet S when the roller 120 rotates. Lubricant such as grease is applied to an inner circumferential surface of the belt 130. The nip forming member N, the holder 140, the stay 200, the belt guide G, and the sliding sheet 150 are disposed inside the belt 130.

The nip forming member N is a member forming a nip portion NP in which the belt 130 is nipped between the nip forming member N and the roller 120. The nip forming member N includes a first nip forming member N1 and a second nip forming member N2.

The first nip forming member N1 includes a first pad P1 and a first fixing plate B1.

The first pad P1 is a rectangular parallelepiped member. The first pad P1 is made of rubber such as silicone rubber. The first pad P1 forms an upstream nip portion NP1 in which the belt 130 is nipped between the first pad P1 and the roller 120.

In the following description, a moving direction of the belt 130 in the upstream nip portion NP1 and the later-described nip portion NP is referred to merely as a "moving direction". The moving direction is along an outer circumferential surface of the roller 120 in the embodiment. This direction is along a direction almost orthogonal to the predetermined direction and the axial direction; therefore, the direction is illustrated as the direction orthogonal to the predetermined direction and the axial direction. The moving direction is the same direction as the conveying direction of the sheet S in the nip portion NP. Note that an upstream side and a downstream side in the moving direction are also referred to merely as "upstream, downstream" in the following description.

The first pad P1 is fixed to a surface of the first fixing plate B1 on the roller 120 side. The first pad P1 slightly protrudes to the upstream side in the moving direction from an upstream end of the first fixing plate B1. Accordingly, the first pad P1 contacts the holder 140 on the upstream side.

The first fixing plate B1 is made of a member harder than the first pad P1, which is, for example, metal.

The second nip forming member N2 is disposed with a space on the downstream side of the first nip forming member N1 in the moving direction. That is, the second nip forming member N2 is spaced apart from the first nip forming member N1 in the conveying direction of the sheet S. The second nip forming member N2 has a second pad P2 and a second fixing plate B2.

The second pad P2 is a rectangular parallelepiped member. The second pad P2 is made of rubber such as silicone rubber. The first pad P2 forms a downstream nip portion NP2 when the belt 130 is nipped between the second pad P2 and the roller 120. The second pad P2 is spaced apart from the first pad P1 in the moving direction.

Accordingly, there exists an intermediate nip portion NP3 on which pressure from the second fixing member 82 does not directly act between the upstream nip portion NP1 and the downstream nip portion NP2. In the intermediate nip portion NP3, while the belt 130 is in contact with the roller 120, the belt 130 is not nipped between any of the first pad P1 and the second pad P2, and the roller 120; therefore, pressure is hardly applied. Accordingly, the sheet S passes the intermediate nip portion NP3 almost without being pressurized while being heated by the roller 120. In the embodiment, an area from an upstream end of the upstream nip portion NP1 to a downstream end of the downstream nip portion NP2, namely, the whole area where the outer circumferential surface of the belt 130 contacts the roller 120 is referred to as the nip portion NP. That is, in the embodiment, the nip portion NP includes the portion where a pressing force from the first pad P1 and the second pad P2 is not applied.

Figure 6A:
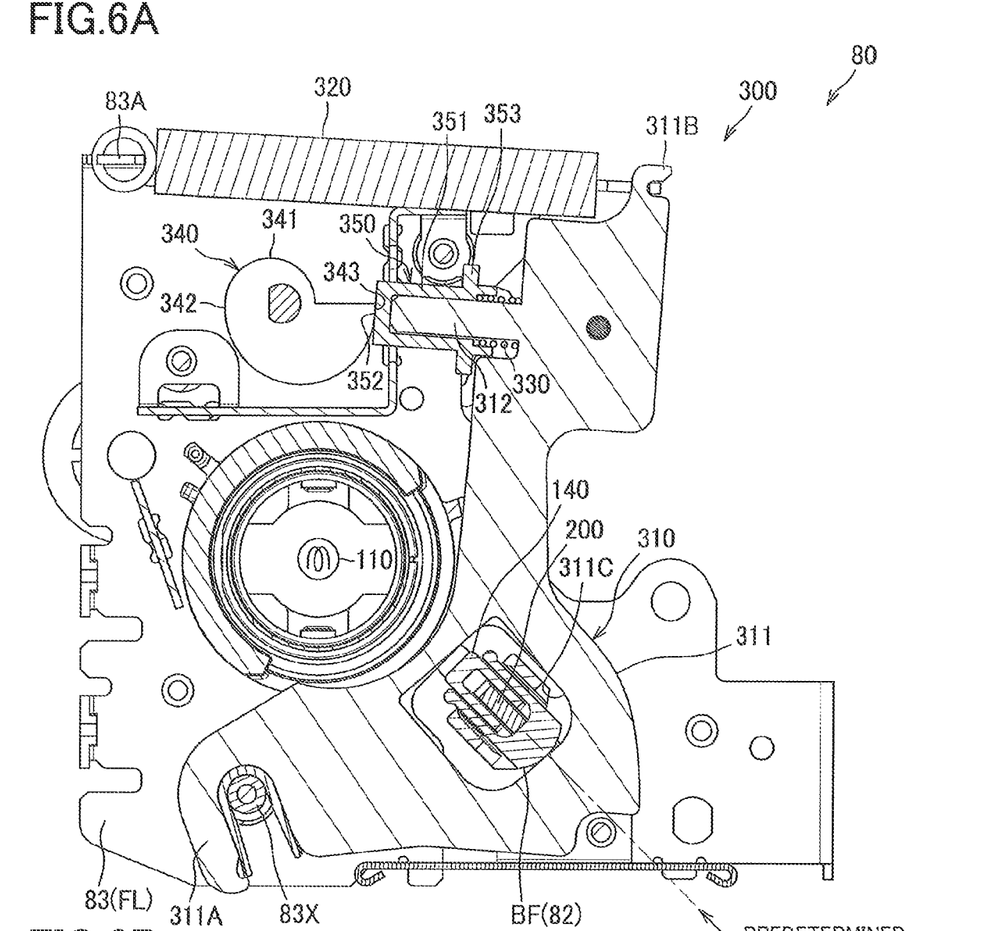
FIG. 6A is a cross-sectional view illustrating the switching mechanism obtained when the nip state is in a low nip state.
Figure 6B:
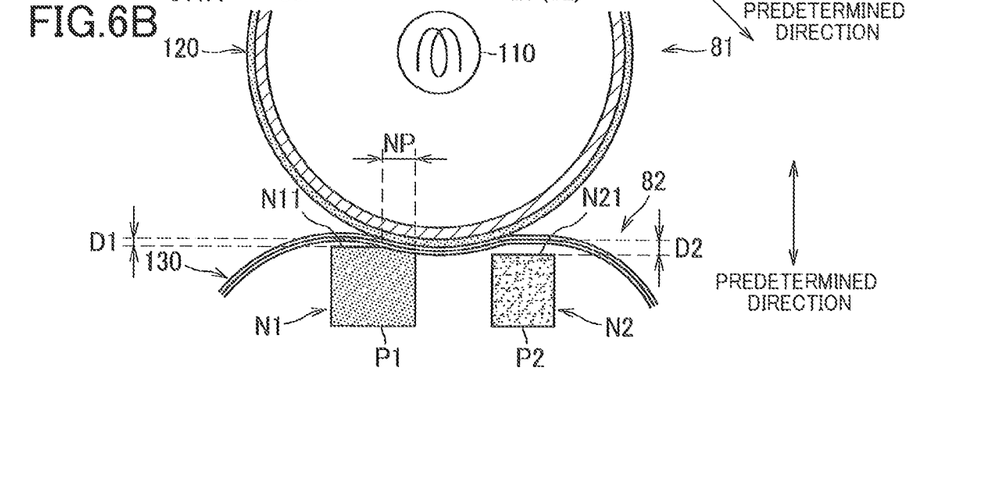
FIG. 6B is a cross-sectional view illustrating a structure around the nip portion.

The second pad P2 is fixed to a surface of the second fixing plate B2 on the roller 120 side. The first pad P2 slightly protrudes to the downstream side from a downstream end of the second fixing plate B2 in the moving direction. Accordingly, the second pad P2 contacts the holder 140 on the downstream side. As illustrated in FIG. 6B, a dimension of the second pad P2 is smaller than a dimension of the first pad P1 in the predetermined direction.

The second fixing plate B2 is made of a member harder than the second pad P2, which is, for example, metal. A dimension of the second fixing plate B2 is the same as the first fixing plate B1 in the predetermined direction.

The hardness of the first pad P1 is higher than the hardness of the elastic layer 122 of the roller 120. The hardness of the second pad P2 is higher than the hardness of the first pad P1. That is, the first pad P1 is softer than the second pad P2.

Here, the hardness means the durometer hardness specified by ISO7619-1. The durometer hardness is a value obtained from a pushing depth of a predetermined push needle at the time of pushing the push needle into a test piece under predetermined conditions. For example, in a case where a durometer hardness of the elastic layer 122 is 5, a durometer hardness of the first pad P1 is preferably 6 to 10, and a durometer hardness of the second pad P2 is preferably 70 to 90.

The hardness of the silicone rubber can be adjusted by changing a ratio of additives (a silica-based filler or a carbon-based filler) which is added at the time of manufacture. Specifically, when the ratio of additives is increased, the hardness of rubber is increased. The hardness can be reduced by adding silicone-based oil. As manufacturing methods for rubber, liquid injection molding and extrusion molding can be adopted. Generally, the liquid injection molding is suitable for low-hardness rubber, and the extrusion molding is suitable for high-hardness rubber.

The holder 140 is a member holding the nip forming member N. That is, the first nip forming member N1 and the second nip forming member N2 are supported by a single holder 140. The holder 140 is supported by the stay 200.

The holder 140 includes a first support surface 141A supporting a surface of the first nip forming member N1 on the opposite side of the first fixing member 81, and a second support surface 141B supporting a surface of the second nip forming member N2 on the opposite side of the first fixing member 81. The first support surface 141A and the second support surface 141B are located at the same position in the predetermined direction. That is, the first support surface 141A and the second support surface 141B are aligned with each other in the moving direction.

Accordingly, the first nip forming member N1 protrudes to the first fixing member 81 side more than the second nip forming member N2 as illustrated in FIG. 6B. In other words, a first distal end surface N11 which is a surface of the first nip forming member N1 on the first fixing member 81 side is located closer to the first fixing member 81 than a second distal end surface N21 which is a surface of the second nip forming member N2 on the first fixing member 81 side. More specifically, the first distal end surface N11 is located nearer to the first fixing member 81 than the second distal end surface N21 in a state in which the respective nip forming members N1, N2 are not pressed onto the first fixing member 81.

Here, FIG. 6B illustrates a state in which only a part of the first distal end surface N11 of the first nip forming member N1 is pressed onto the first fixing member 81, and the other part of the first distal end surface N11 and the second distal end surface N21 are not pressed onto the first fixing member 81. Therefore, each of positions of the other part of the first distal end surface N11 and the second distal end surface N21 is the same position as each of positions of the other part of the first distal end surface N11 and the second distal end surface N2 in the state in which each of the nip forming members N1, N2 is not pressed onto the first fixing member 81. That is, the other part of the first distal end surface N11 is located closer to the first fixing member 81 than the second distal end surface N21. In other words, a shortest distance D1 between a portion, of the first distal end surface N11, to which pressure is not applied and the outer circumferential surface of the first fixing member 81 in the predetermined direction is smaller than a shortest distance D2 between the second distal end surface N21 to which pressure is not applied and the outer circumferential surface of the first fixing member 81.

The stay 200 is a member positioned on the opposite side of the nip forming member N with respect to the holder 140 and supporting the holder 140. The stay 200 is made of metal or the like. A buffer member BF made of resin or the like (see FIG. 4A) is mounted to an end portion of the stay 200 in the axial direction. The buffer member BF is a member for suppressing the stay 200 made of metal from being rubbed against a later-described metal arm 310 (see FIG. 4A).

The belt guide G is a member guiding an inner circumferential surface 131 of the belt 130. The belt guide G is made of resin or the like having heat resistance. The belt guide G includes an upstream guide G1 and a downstream guide G2.

The sliding sheet 150 is a rectangular sheet for reducing frictional resistance between the respective pads P1, P2 and the belt 130. The sliding sheet 150 is nipped between the inner circumferential surface 131 of the belt 130 and the respective pads P1, P2 in the nip portion NP. The sliding sheet 150 is made of an elastically deformable material. Any type of material can be used for the sliding sheet 150, but a resin sheet containing polyimide is adopted in the embodiment.

Figure 3:
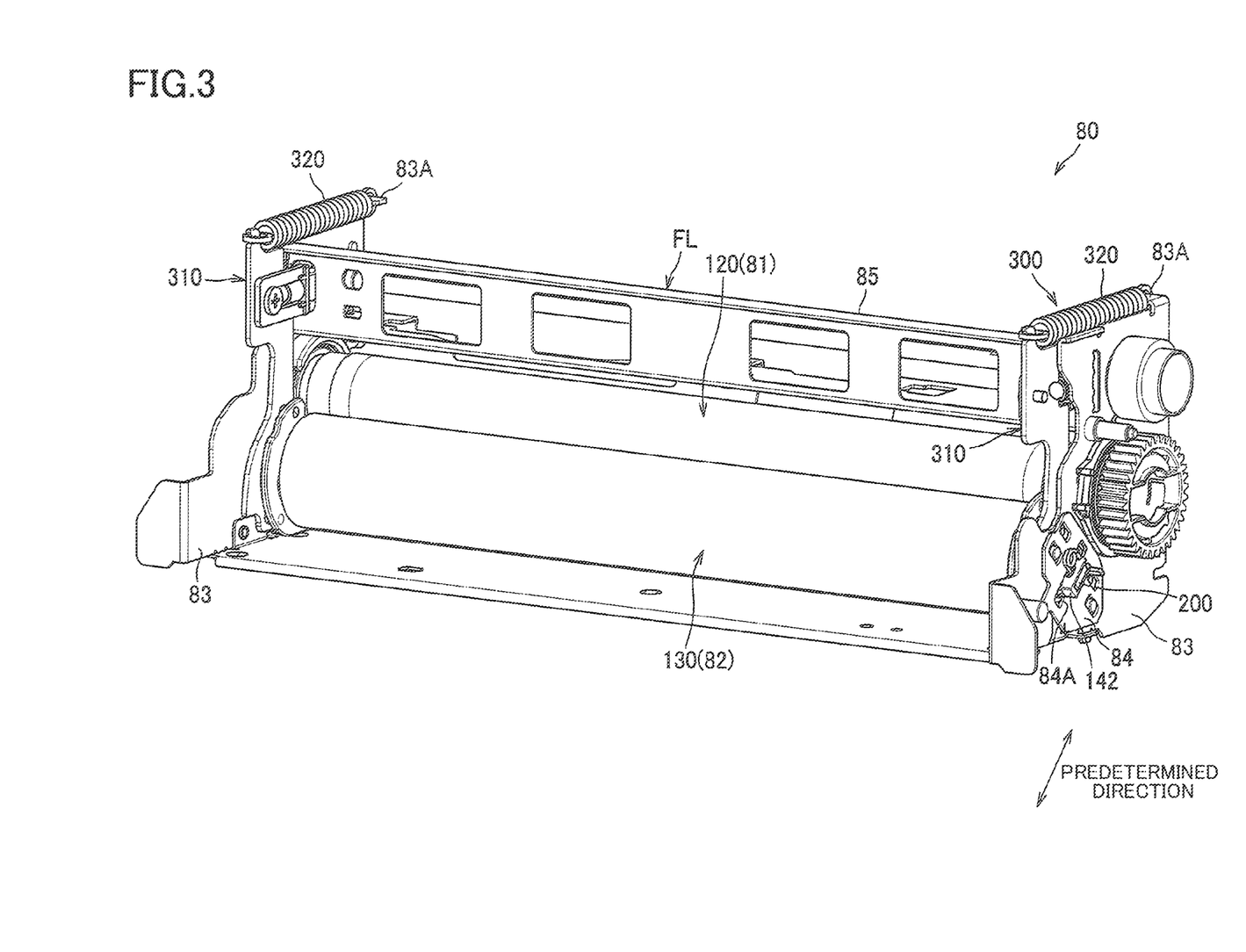
FIG. 3 is a perspective view illustrating a switching mechanism.

As illustrated in FIG. 3, the fixing device 80 further includes the frame FL and the switching mechanism 300. The frame FL is a frame supporting the first fixing member 81 and the second fixing member 82, and the frame FL is made of metal or the like. The frame FL includes side frames 83 and brackets 84 disposed on both sides of the first fixing member 81 and the second fixing member 82 in the axial direction and a connection frame 85 connected to each of the side frames 83.

The side frames 83 are frames supporting the first fixing member 81 and the second fixing member 82. Each of the side frames 83 includes a spring engaging portion 83A engaging with one end portion of a later-described first spring 320.

The brackets 84 are members supporting the second fixing member 82 so as to be movable in the predetermined direction, and the brackets 84 are respectively fixed to the side frames 83. More specifically, the brackets 84 disposed on both sides in the axial direction have first long holes 84A supporting end portions 142 of the holder 140 in the axial direction so as to be movable in the predetermined direction. The first long holes 84A are long holes extending in the predetermined direction.

Here, the first long holes 84A correspond to grooves as guides. The end portions 142 of the holder 140 in the axial direction are respectively inserted into the first long holes 84A on both sides in the axial direction and the second fixing member 82 is supported so as to be movable in the predetermined direction. The grooves as guides may be bottomed grooves.

The switching mechanism 300 is driven by the controller 100, and is a mechanism capable of switching a nip state of the first fixing member 81 and the second fixing member 82 to a strong nip state, a middle nip state in which a nip pressure is lower than that of the strong nip state, and a low nip state in which the nip pressure is lower than that of the middle nip state. Here, the belt 130 is nipped between at least one of the pads P1 and P2, and the first fixing member 81 in any state of the strong nip state, the middle nip state, and the low nip state.

Figure 4A:
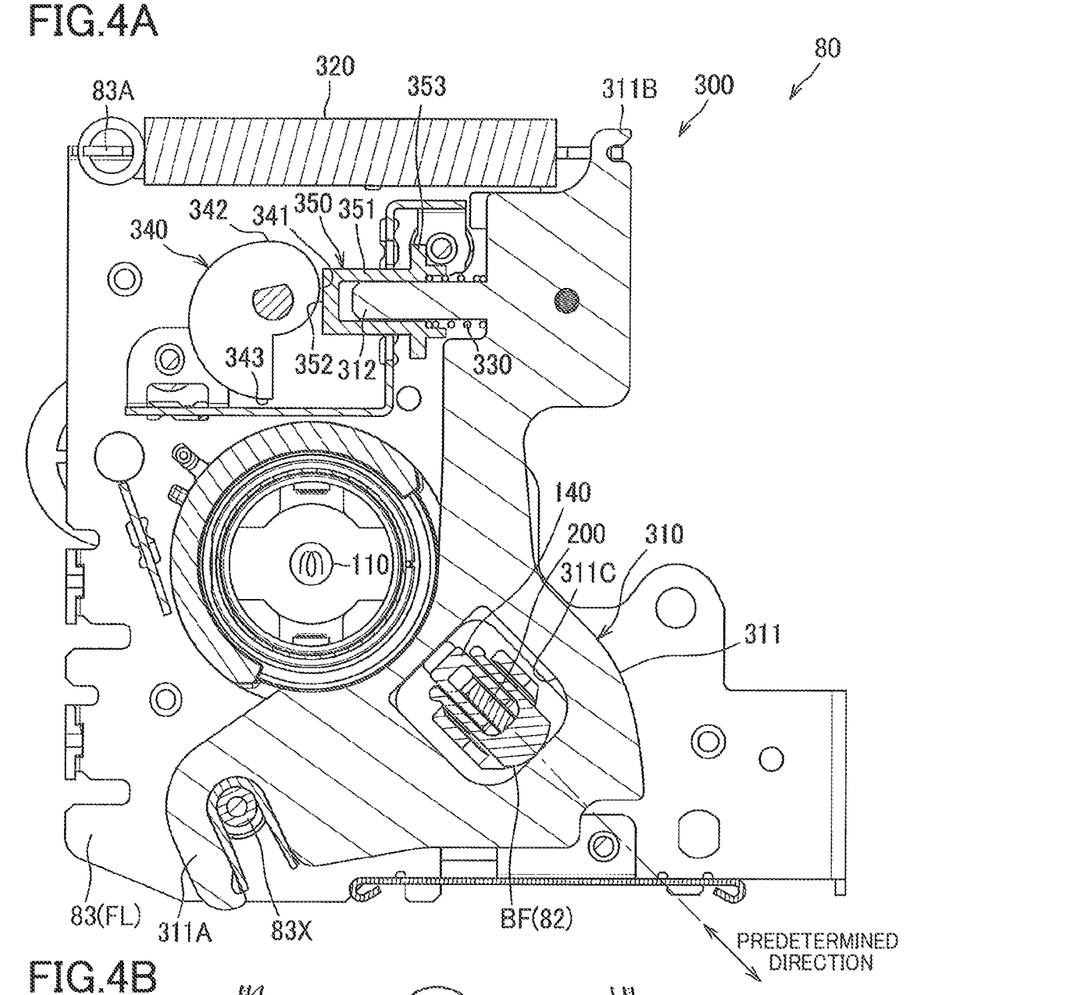
FIG. 4A is a cross-sectional view illustrating the switching mechanism obtained when a nip state is in a strong nip state.

As illustrated in FIG. 4A, the switching mechanism 300 includes the arm 310, the first spring 320, a second spring 330, and a cam 340. The arm 310, the first spring 320, the second spring 330 and the cam 340 are provided on one end side and the other end side in the axial direction of the frame FL, respectively.

Each of the arms 310 is a member for pressing the stay 200 toward the first fixing member 81 through the buffer member BF. Each of the arms 310 supports the second fixing member 82 and is supported by the side frame 83 so as to be pivotable.

Each of the arms 310 has an arm body 311 and a cam follower 350. The arm body 311 is a plate-like member with an L-shape made of metal or the like.

Each of the side frames 83 includes a boss 83X supporting the arm body 311 so as to be pivotable. The arm body 311 includes one end portion 311A supported by the boss 83X of the side frame 83 so as to be pivotable, the other end portion 311B to which the first spring 320 is coupled, and an engaging hole 311C supporting the second fixing member 82. The engaging hole 311C is disposed between the one end portion 311A and the other end portion 311B and engaged with the buffer member BF.

The arm body 311 further includes a guide protrusion 312 extending toward the cam 340. The guide protrusion 312 supports the cam follower 350 so as to be movable.

The cam follower 350 is contactable with the cam 340. The cam follower 350 is made of resin or the like, and includes a tubular portion 351 fitted into the guide protrusion 312, a contact portion 352 provided at one end of the tubular portion 351, and a flange portion 353 provided at the other end of the tubular portion 351.

The tubular portion 351 is supported by the guide protrusion 312 so as to be movable in a direction in which the guide protrusion 312 extends. The contact portion 352 is a wall blocking an opening of the end portion of the tubular portion 351 on the cam 340 side, and the contact portion 352 is disposed between the cam 340 and a tip end of the guide protrusion 312. The flange portion 353 protrudes from the other end of the tubular portion 351 in a direction orthogonal to the moving direction of the cam follower 350.

Then, the second spring 330 is disposed between the tubular portion 351 and the arm body 311. Accordingly, the arm body 311 is urged by the first spring 320 and can be urged by the second spring 330.

The first spring 320 is a spring configured to apply a load to the nip portion NP by applying a first urging force to the second fixing member 82. Specifically, the first spring 320 applies the first urging force to the second fixing member 82 through the arm body 311. The first spring 320 is an extension coil spring made of metal or the like, one end of which is coupled to the spring engaging portion 83A of the side frame 83 and the other end is coupled to the other end portion 311B of the arm body 311.

The second spring 330 is a spring capable of applying a second urging force in a direction opposite to the first urging force to the second fixing member 82. Specifically, the second spring 330 can apply the second urging force to the second fixing member 82 through the arm body 311. The second spring 330 is a compression coil spring made of the metal or the like, and is disposed between the tubular portion 351 and the arm body 311 in a state in which the guide protrusion 312 is inserted into a space surrounded by the compression coil spring.

The cam 340 is a member configured to move the second fixing member 82 in the predetermined direction by pressing the arm 310 through the cam follower 350. The cam 340 has a function of changing an extension/contraction state of the second spring 330 to a first extension/contraction state in which the second urging force is not applied to the second fixing member 82, a second extension/contraction state in which the second urging force is applied to the second fixing member 82, and a third extension/contraction state in which the spring is more deformed than the second extension/contraction state. The cam 340 is pivotable to a first cam position illustrated in FIG. 4A, a second cam position illustrated in FIG. 5A, and a third cam position illustrated in FIG. 6A by being controlled by the controller 100.

The cam 340 is made of resin or the like, and includes a first portion 341, a second portion 342, and a third portion 343. The first portion 341, the second portion 342, and the third portion 343 are located on an outer circumferential surface of the cam 340.

The first portion 341 is a portion nearest to the cam follower 350 when the cam 340 is located at the first cam position. As illustrated in FIG. 4A, the first portion 341 is spaced apart from the cam follower 350 when the cam 340 is located at the first cam position.

Figure 5A:
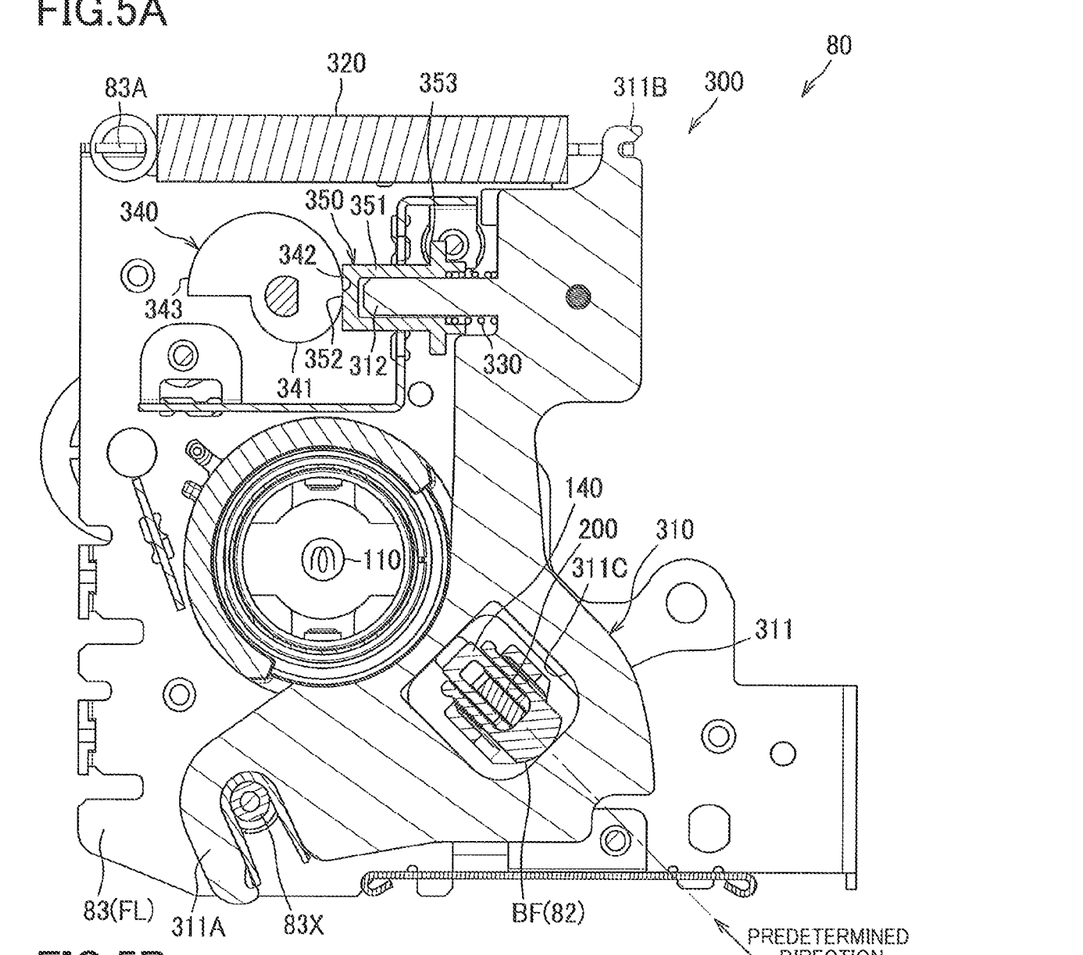
FIG. 5A is a cross-sectional view illustrating the switching mechanism obtained when the nip state is in a middle nip state.

The second portion 342 is a portion which comes into contact with the cam follower 350 when the cam 340 is located at the second cam position. More specifically, the second portion 342 is a portion which comes into contact with the cam follower 350 when the cam 340 pivots approximately 90 degrees in the illustrated clockwise direction from the first cam position as illustrated in FIG. 5A. A distance from the second portion 342 to a pivot center of the cam 340 is greater than a distance from the first portion 341 to the pivot center of the cam 340.

The third portion 343 is a portion which comes into contact with the cam follower 350 when the cam 340 is located at the third cam position. More specifically, the third portion 343 is a portion in a state in which the cam 340 pivots approximately 270 degrees in the illustrated clockwise direction from the first cam position, in other words, a portion which comes into contact with the cam follower 350 when the cam 340 pivots approximately 180 degrees in the illustrated clockwise direction from the second com position as illustrated in FIG. 6A. A distance from the third portion 343 to the pivot center of the cam 340 is greater than the distance from the second portion 342 to the pivot center of the cam 340.

When the cam 340 is located at the first cam position, the cam 340 is spaced apart from the cam follower 350; therefore, the extension/contraction state of the second spring 330 is in the first extension/contraction state. When the cam 340 causes the extension/contraction state of the second spring 330 to be in the first extension/contraction state as described above, the arm body 311 is in a first posture illustrated in FIG. 4A.

Specifically, the cam 340 is spaced apart from the cam follower 350 when the cam 340 causes the extension/contraction state of the second spring 330 to be in the first extension/contraction state; therefore, the second urging force of the second spring 330 is not applied to the second fixing member 82 through the arm body 311, and only the first urging force of the first spring 320 is applied to the respective pads P1, P2 of the second fixing member 82 through the arm body 311. When the first urging force is applied to the second fixing member 82 by the first spring 320 and the second urging force is not applied to the second fixing member 82 by the second spring 330 as described above, the nip state is in the strong nip state, and the nip pressure is a first nip pressure.

When the cam 340 pivots from the first cam position illustrated in FIG. 4A to the second cam position illustrated in FIG. 5A, the cam 340 comes into contact with the cam follower 350 and moves the cam follower 350 by a predetermined amount with respect to the arm body 311. Accordingly, the extension/contraction state of the second spring 330 is in the second extension/contraction state in which the spring is more deformed than the first extension/contraction state when the cam 340 is located at the second cam position.

The cam follower 350 is supported by the cam 340 when the cam 340 is located at the second cam position; therefore, the second urging force of the second spring 330 is applied to the second fixing member 82 in the direction opposite to the first urging force through the arm body 311. Accordingly, when the first urging force is applied to the second fixing member 82 by the first spring 320 and the second urging force is applied to the second fixing member 82 in the direction opposite to the first urging force by the second spring 330, the nip state is in the middle nip state, and the nip pressure is a second nip pressure smaller than the first nip pressure.

When the cam 340 causes the extension/contraction state of the second spring 330 to be in the second extension/contraction state, the arm body 311 remains in the above-described first posture. Here, in the state in which the second pad P2 is pressed onto the roller 120, namely, in the state in which the load is applied to the second pad P2, the second pad P2 is hardly deformed regardless of magnitude of the load. Then, the second pad P2 is hardly deformed; therefore, the posture of the stay 200 supporting the second pad P2 and the posture of the arm 310 supporting the stay 200 are maintained almost in fixed postures regardless of magnitude of the load. Since the position of the first pad P1 is determined by the position of the second pad P2, the position of the first pad P1 is not changed in a state in which the second pad P2 is hardly deformed and the position thereof is not changed. Therefore, an entire nip width (a length from an entrance of the upstream nip portion NP1 to an exit of the downstream nip portion NP2) is not changed and the posture of the arm 310 is maintained almost in the fixed posture in both cases of the strong nip state (the first nip pressure) and the middle nip state (the second nip pressure).

Figure 4B:
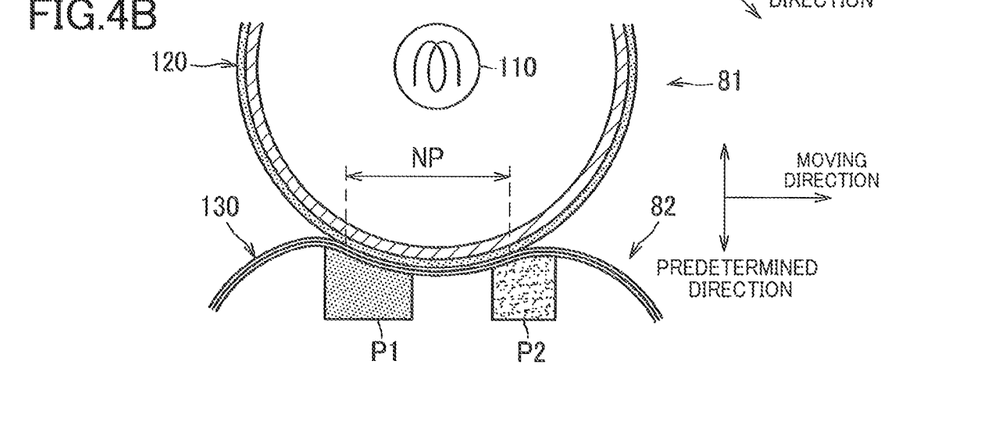
FIG. 4B is a cross-sectional view illustrating a structure around a nip portion.
Figure 5B:
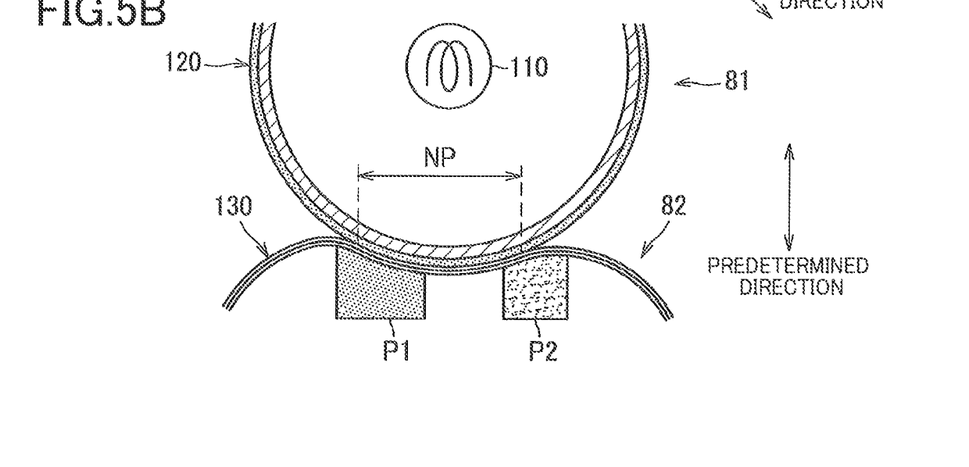
FIG. 5B is a cross-sectional view illustrating a structure around the nip portion.

Since the posture of the arm body 311 is in the first posture even when the extension/contraction state of the second spring 330 is any one of the first extension/contraction state and the second extension/contraction state as described above, the belt 130 is nipped between each of the first pad P1 and the second pad P2, and the roller 120 in both a state in which the nip pressure is the first nip pressure and a state in which the second nip pressure as illustrated in FIG. 4B and FIG. 5B.

When the cam 340 pivots from the second cam position illustrated in FIG. 5A to the third cam position illustrated in FIG. 6A, the cam 340 further moves the cam follower 350 with respect to the arm body 311, then, the cam 340 presses the arm body 311 through the cam follower 350. Accordingly, the extension/contraction state of the second spring 330 becomes in the third extraction/contraction state in which the spring is more deformed than the second extension/contraction state, and the arm body 311 pivots from the first posture to a second posture different from the first posture.

Specifically, in an early stage in a pivoting process in which the cam 340 pivots from the second cam position to the third cam position, the cam follower 350 moves with respect to the arm body 311 so that the contact portion 352 of the cam follower 350 comes close to the tip end of the guide protrusion 312. When the contact portion 352 comes into contact with the tip end of the guide protrusion 312, the extension/contraction state of the second spring 330 becomes in the third extraction/contraction state. In the case in which the cam 340 causes the extension/contraction state of the second spring 330 to be in the third extraction/contraction state, the contact portion 352 as a part of the cam follower 350 is nipped between the cam 340 and the guide protrusion 312. After that, when the cam 340 further pivots, the cam 340 presses the guide protrusion 312 through the contact portion 352; therefore, the arm body 311 pivots from the first posture to the second posture against the urging force of the first spring 320.

Accordingly, when the arm body 311 is in the second posture, the second fixing member 82 is disposed at a position more spaced apart from the roller 120 (the position of FIG. 6B) than a position in which the arm body 311 is in the first posture (the position of FIG. 5B). Since the position of the second fixing member 82 with respect to the roller 120 is changed as described above, the width of the nip portion NP becomes smaller when the arm body 311 is in the second posture than in the case in which the arm body 311 is in the first posture as illustrated in FIG. 6B, and the nip pressure becomes a third nip pressure smaller than the second nip pressure. That is, since the posture of the arm 310 is changed by the cam 340, the nip pressure and the nip width are changed. Specifically, when the arm 310 is in the second posture, the nip state is in the low nip state in which the belt 130 is nipped only between the first pad P1 and the roller 120 and the belt 130 is not nipped between the second pad P2 and the roller 120. Accordingly, when the arm 310 is in the second posture, an upstream nip pressure and an upstream nip width become small and the downstream nip pressure becomes zero. Moreover, since the urging force of the first spring 320 can be received by the cam 340 through the arm body 311 and the contact portion 352 of the cam follower 350 in the low nip state, the urging force of the first spring 320 is not applied to the first pad P1. That is, the nip portion NP is formed only by deformation of the first pad P1 in the low nip state.

The controller 100 includes, for example, a CPU, a RAM, a ROM, and an input/output circuit. The controller 100 has a function of setting a sheet interval according to a kind of the sheet S to be printed, and controlling conveyance of the sheet S. Here, the sheet interval is an interval between an upstream end of a preceding sheet S in the conveying direction and a downstream end of a subsequent sheet S in the conveying direction.

Specifically, the controller 100 conveys the sheets at a first interval between the upstream end of the preceding sheet S and the downstream end of the subsequent sheet S in a case where the controller 100 conveys a plurality of first kind of sheets. More specifically, in the case where the controller 100 conveys the plurality of first kind of sheets, the controller 100 sets a time interval at which the plurality of first kind of sheets are sequentially picked up from the supply tray 31 to a first time interval corresponding to the first interval. As a result, sequential two of the plurality of first kind of sheets are conveyed spaced at the first interval.

The controller 100 conveys the sheet at a second interval larger than the first interval between the upstream end of the preceding sheet S and the downstream end of the subsequent sheet S in a case where the controller 100 conveys a plurality of second kind of sheets belonging to a kind in which curl occurs more frequently than the first kind of sheet. Specifically, in the case where the controller 100 conveys the plurality of second kind of sheets, the controller 100 sets the time interval at which the plurality of second kind of sheets are sequentially picked up from the supply tray 31 to a second time interval corresponding to the second interval. As a result, sequential two of the plurality of second kind of sheets are conveyed spaced at the second interval.

The first interval is set to a smaller interval than a circumferential length of the belt 130. The second interval is set to a larger interval than the circumferential length of the belt 130.

The second kind of sheet may be, for example, a sheet thinner in thickness than the first kind of sheet. The second kind of sheet may also be, for example, a sheet with a smaller basis weight than the first kind of sheet.

The controller 100 also has a function of setting the sheet interval based on kind information indicating the kind of the sheet inputted by a user. The user operates an operation panel or operation buttons provided on an outer surface of the body housing 2, thereby inputting the kind information to the controller 100 in the embodiment. Specifically, the user operates the operation panel or the operation buttons to input kind information and the like when a USB memory storing data is connected to the body housing 2 to print the data in the USB memory.

In a case where the kind information is information indicating the second kind of sheet, the controller 100 has a function of notifying the user of information for selecting whether the sheet interval is to be set to the second interval or not through the operation panel. Then, when information indicating that the sheet interval is to be set to the second interval is inputted by the user, the controller 100 is configured to set the sheet interval to the second interval, and when information indicating that the sheet interval is not to be set to the second interval is inputted by the user, the controller 100 is configured to set the sheet interval to the first interval.

The controller 100 is executable of double-sided printing, and in a case where the controller 100 executes the double-sided printing for the plurality of first kind of sheets, the controller 100 has a function of setting a minimum sheet interval in the double-sided printing to the first interval. In a case where the controller 100 executes the double-sided printing for the plurality of second kind of sheets, and the controller 100 has a function of setting the minimum sheet interval in the double-sided printing to the second interval. Specifically, the controller 100 determines an order of pages to be printed based on information indicating the number of pages to be printed in a print command, which is contained in the print command. The determination of the order of pages is made based on a table indicating the relation between the number of pages and the order of pages. For example, in a case where the number of pages is four, the controller 100 sets the order of pages to page 2, page 4, page 1, and page 3 in order.

Then, the controller 100 determines (i) timing of picking up sheets from the supply tray 31, (ii) a period of time during which the sheet is stopped in the re-conveyance path 93 by stopping driving of the re-conveying rollers 96, and (iii) which of the first conveyance path 91 and the second conveyance path 92 the sheet is conveyed to, such that the minimum sheet interval becomes the sheet interval which is set based on the determined order of pages and the determined sheet interval. Specifically, for example, when the controller 100 executes the double-sided printing for the plurality of sheets, the controller 100 sets an interval between an upstream end of the first conveyed sheet in the conveying direction and a downstream end of the second conveyed sheet in the conveying direction as the set sheet interval. That is, the minimum sheet interval in the double-sided printing is an interval between the upstream end of the preceding sheet in the conveying direction and the downstream end of the subsequent sheet in the conveying direction.

In the case where the sheet interval is set to the second interval, the controller 100 has a function of setting the temperature of the heater 110 to be lower than in the case where the sheet interval is set to the first interval.

Next, the operation of the controller 100 will be explained in detail.

Figure 7:
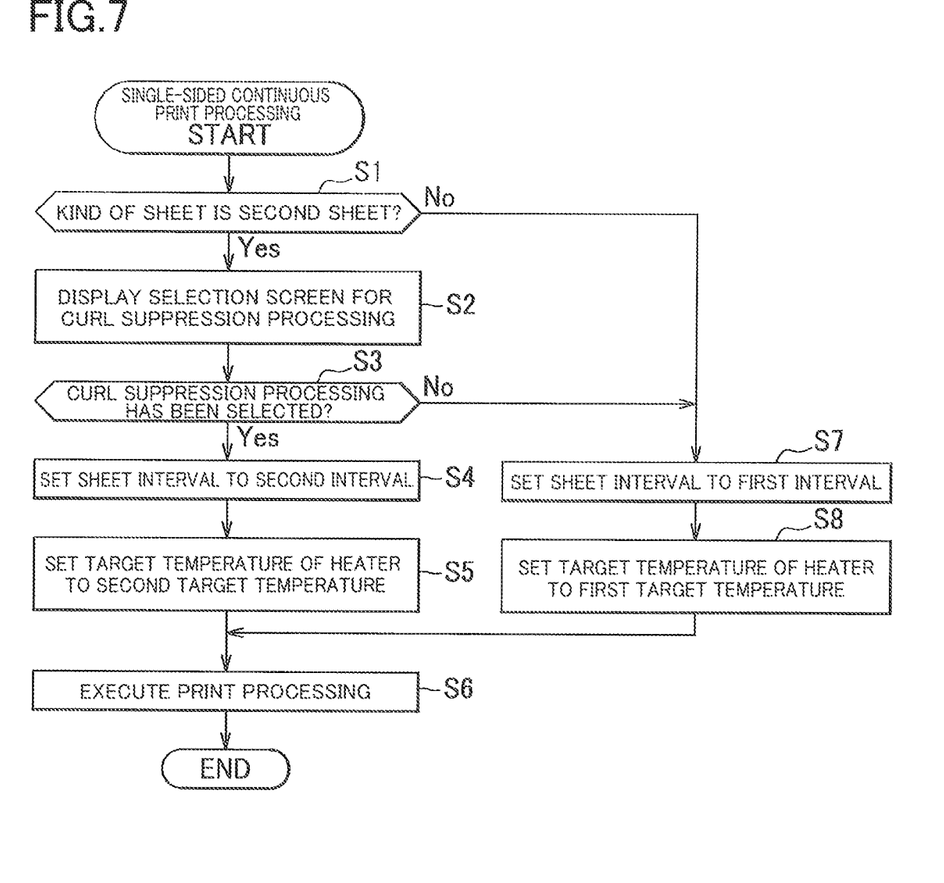
FIG. 7 is a flowchart illustrating single-sided continuous print process.

The controller 100 executes a single-sided continuous print process illustrating in FIG. 7 when receiving a print command instructing printing on one sides of a plurality of sheets. In the single-sided continuous print process, the controller 100 first determines whether the kind of sheets to be printed is the second kind of sheet or not based on the print command (S1).

When it is determined that the kind of sheets is not the second kind of sheet at Step S1 (No), the controller 100 sets the sheet interval to the first interval (S7) and sets a target temperature of the heater 110 to a first target temperature (S8). After Step S8, the controller 100 executes a print process that executes printing on sheets (S6) and ends the single-sided continuous print process. Specifically, when Step S6 is executed after executions of Steps S7, S8, the controller 100 controls an amount of electric current flowing to the heater 110 such that the temperature of the heater 110 reaches the first target temperature, and the controller 100 conveys the plurality of sheets spaced at first intervals respectively to execute printing on each sheet.

When it is determined that the kind of sheets is the second kind of sheet at Step S1 (Yes), the controller 100 displays, on an operation panel, a selection screen for selecting whether a curl suppression process for suppressing occurrence of curl in the second kind of sheet is to be executed or not (S2). The selection screen may be, for example, a screen on which a message notifying that "EXECUTE CURL SUPPRESSING PROCESS?" and images of buttons "Yes", "No" for selecting the execution of the curl suppression process are displayed.

After Step S2, the controller 100 determines whether an execution of the curl suppression process has been selected or not (S3). When it is determined that the execution of the curl suppression process has not been selected at Step S3 (No), the controller 100 proceeds to a process of Step S7.

When it is determined that the execution of the curl suppression process has been selected at Step S3 (Yes), the controller 100 sets the sheet interval to the second interval which is greater than the first interval (S4), and sets the target temperature of the heater 110 to a second target temperature which is lower than the first target temperature (S5).

After Step S5, the controller 100 executes the print process that executes printing on the sheets (S6) and ends the curl suppression process. Specifically, when Step S6 is executed after executions of Steps S4, S5, the controller 100 controls electric current flowing to the heater 110 such that the temperature of the heater 110 reaches the second target temperature and conveys the plurality of sheets spaced at the second interval respectively to execute printing on each sheet.

Figure 8:
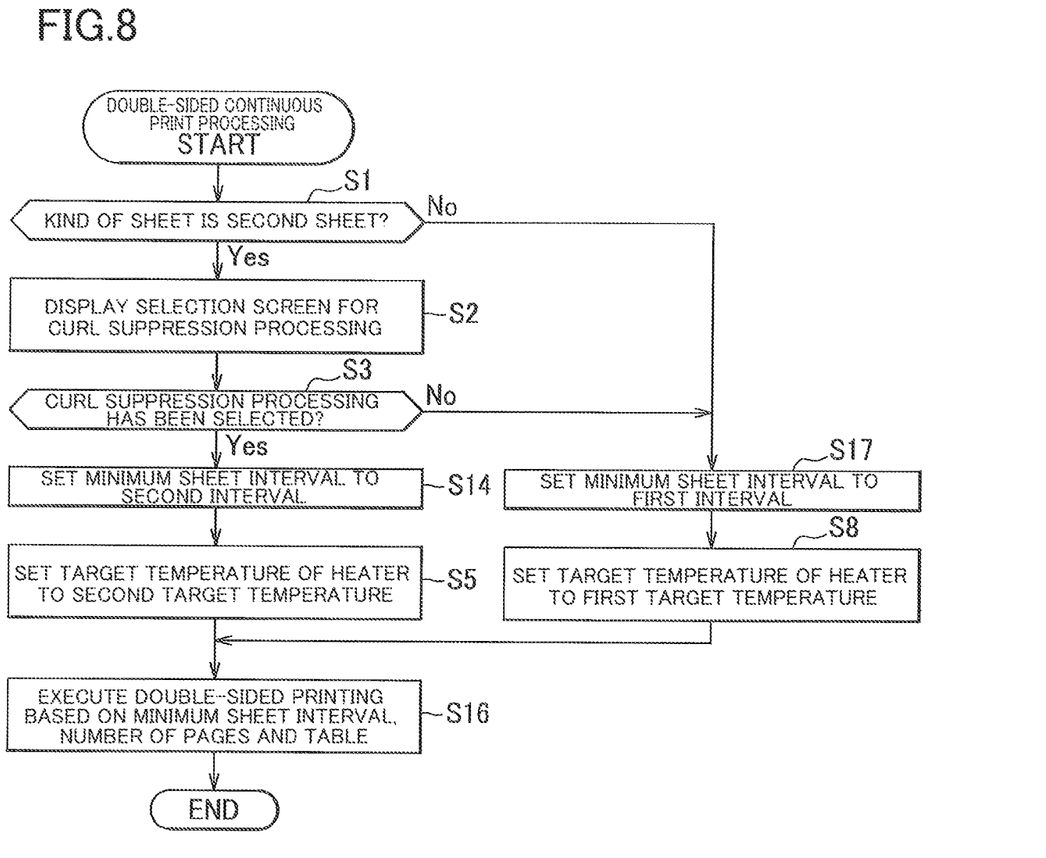
FIG. 8 is a flowchart illustrating double-sided continuous print process.

The controller 100 executes the double-sided continuous print process illustrated in FIG. 8 when receiving a print command instructing printing on both sides of a plurality of sheets. The double-sided continuous print process is a process in which a part of the above single-sided continuous print process is changed; therefore, the same symbols are given to the same process and explanation thereof is omitted.

In the double-sided continuous print process, the controller 100 first determines the kind of sheets at Step S1. When the kind of the sheets is not the second kind of sheet at Step S1 (No), the controller 100 sets the minimum sheet interval in double-sided printing to the first interval (S17). After Step S17, the controller 100 executes Step S16 after execution of Step S8. The controller 100 determines the order of pages to be printed based on the number of pages to be printed and the table at Step S16. After that, the controller 100 executes the double-sided printing after determining timing of picking up sheets from the supply tray 31 and the like such that the minimum sheet interval becomes the sheet interval set based on the determined order of pages and the sheet interval set at Step S17. Accordingly, when Step S16 is executed after executions of Steps S17, S8, the controller 100 controls electric current flowing to the heater 110 such that the temperature of the heater 110 reaches the first target temperature, and conveys sheets such that the minimum sheet interval becomes the first interval to execute printing on each sheet.

When it is determined that the kind of sheets is the second kind of sheet at Step S1 (Yes), the controller 100 executes the processes of Steps S2, S3. When it is determined that the execution of the curl suppression process has not been selected at Step S3 (No), the controller 100 proceeds to the process of Step S17.

When it is determined that the execution of the curl suppression process has been selected at Step S3 (Yes), the controller 100 sets the minimum sheet interval in the double-sided printing to the second interval greater than the first interval (S14). After Step S14, the controller 100 executes Step S16 after execution of Step S5. When executing Step S16 after executions of Steps S14, S5, the controller 100 controls electric current flowing to the heat 110 such that the temperature of the heater 110 reaches the second target temperature, and conveys the sheets such that the minimum sheet interval becomes the second interval to execute printing on each sheet.

Next, an example of the operation of the controller 100 will be explained in detail.

In a case where the controller 100 executes the single-sided printing for data in the USB memory connected to the body housing 2, when the user operates the operation panel or the like, selects the single-sided printing as a print mode, selects the first kind of sheet as the kind of sheets, and presses a button for executing printing, the print command containing data and information selected by the user is outputted to the controller 100. When receiving the print command, the controller 100 determines whether a single-sided continuous print process in which a plurality of sheets are continuously printed is executed or not based on the print command.

When it is determined that the single-sided continuous print process is not executed, namely, when the number of prints is one piece, the controller 100 executes a well-known the print process. When it is determined that the single-sided continuous print process is executed, the controller 100 executes the single-sided continuous print process illustrated in FIG. 7.

In the single-sided continuous print process, since the kind of sheets is the first kind of sheet, the controller 100 determines No at Step S1. After that, controller 100 sets the sheet interval to the first interval and sets the target temperature of the heater 110 to the first target temperature to execute print process (S7, S8, and S6). Accordingly, the plurality of first kind of sheets are conveyed at the small first intervals; therefore, the plurality of first kind of sheets can be printed at high print speed.

When the single-sided continuous print process is executed in a state in which the single-sided printing is selected as the print mode and the second kind of sheet is selected, since the kind of sheets is the second kind of sheet, the controller 100 determines Yes at Step S1. After that, the controller 100 displays the selection screen for selecting whether the curl suppression process is executed or not on the operation panel (S2).

When the user selects that the curl suppression process is not executed on the selection screen (S3: No), the controller 100 sets the sheet interval to the first interval and sets the target temperature of the heater 110 to the first target temperature to execute print process (S7, S8, and S6). Accordingly, the plurality of second kind of sheets are conveyed at the small first intervals; therefore, it is possible to give priority to printing of the plurality of second kind of sheets at high print speed over the suppression of curl of the second kind of sheets.

When the user selects that the curl suppression process is executed on the selection screen (S3: Yes), the controller 100 sets the sheet interval to the second interval and sets the target temperature of the heater 110 to the second target temperature to execute print process (S4 to S6). The plurality of second kind of sheets are conveyed at the large second intervals and the temperature of the heater 110 becomes the low second target temperature; therefore, curl of the second kind of sheets can be suppressed.

Since the operation by the user and the operation by the controller 100 at the time of double-sided printing are approximately the same as in the single-sided printing, the explanation is omitted.

According to the above, the following advantages can be obtained in the embodiment.

When the plurality of second kind of sheets in which curl occurs more frequently than the first kind of sheets are conveyed, the sheet interval is set to the second interval which is greater than the interval at which the plurality of first kind of sheets are conveyed. Accordingly, a period of time during which the sheet is not passing the nip portion NP becomes long and a temperature difference between the roller 120 and the belt 130 becomes small; therefore, the occurrence of curl in the second kind of sheets can be suppressed. Specifically, the occurrence of curl in the second kind of sheet thinner in thickness or in the second kind of sheet with a smaller basis weight in which curl occurs more frequently can be suppressed. Since curl does not occur easily in the first kind of sheets as compared with the second kind of sheets, occurrence of curl in the first kind of sheets can be suppressed at the time of conveying the first kind of sheets even when the sheet interval is set to the small first interval. Therefore, it is possible to suppress curl of the sheets regardless of the kind of sheets.

Since the second interval is greater than the circumferential length of the belt 130, the belt 130 rotates once or more in a period from a timing of discharge of the preceding second kind of sheet from the nip portion NP to a timing when the subsequent second kind of sheet reaches the nip portion NP; therefore, the entire temperature of the belt 130 can be positively increased before the subsequent sheet reaches the nip portion NP.

The first distal end surface N11 of the first nip forming member N1 is disposed nearer to the roller 120 than the second distal end surface N21 of the second nip forming member N2; therefore, it is possible to switch a mode in which the belt 130 is nipped only between the roller 120 and the first nip forming member N1 and a mode in which the belt 130 is nipped between the roller 120 and each of the first nip forming member N1 and the second nip forming member N2 only by changing a positional relation between the roller 120 and the nip forming member N.

According to the above configuration, the first pad P1 is made to be softer than the second pad P2; therefore, toner can be fixed well on various kinds of sheets by the softer first pad P1, and toner on the sheets can be glossed by pressing the sheet by the second pad P2 which is more rigid.

Since the first nip portion N1 is spaced apart from the second nip forming portion N2 in the conveying direction of the sheet, it is possible to suppress contact of respective pads P1, P2 with each other when they are deformed, and to suppress effects on the shape of the nip portion NP and the nip pressure due to the contact of the respective pads P1, P2 with each other.

The controller 100 sets the sheet interval based on the kind information indicating the kind of sheets inputted by the user; therefore, it is possible to suppress curl of the sheets based on the kind of sheets inputted by the user.

The user can select whether the curl suppression process is executed or not, namely, whether the sheet interval is expanded or not at the time of printing the second kind of sheets; therefore, the sheet interval can be expanded when the user desires to give priority to the suppression of curl, and the sheet interval can be maintained at the smaller interval when the user desires to give priority to print speed.

The controller 100 sets the minimum sheet interval in the double-sided printing to the first interval when the plurality of first kind of sheets are double-sided printed, and sets the minimum sheet interval in the double-sided printing to the second interval when the plurality of second kind of sheets are double-sided printed; therefore, curl of the sheets can be suppressed also at the time of double-sided printing.

In the case where the sheet interval is set to the second interval, the controller 100 sets the temperature of the heater 110 to be lower than in the case where the sheet interval is set to the first interval; therefore, the temperature difference between the roller 120 and the belt 130 can be small, and curl of the second kind of sheets can be suppressed more effectively.

The present disclosure is not limited to the above embodiment, and can be used in various manners as illustrated as examples below.

The kind information is inputted by operating the operation panel or the like of the body housing 2 in the above embodiment; however, the present disclosure is not limited to this. For example, the kind information may be inputted by operating a terminal such as a personal computer by the user.

The temperature of the heater 110 is set to be lower in the case where the sheet interval is set to the second interval than in the case where the sheet interval is set to the first interval in the above embodiment; however, the present disclosure is not limited to this. The temperature of the heater set in the case where the sheet interval is set to the second interval and the temperature of the heater set in the case where the sheet interval is set to the first interval may be the same.

The selection for whether the curl suppression process is executed or not is made by the user by displaying the selection screen of the curl suppression process in the above embodiment; however, the present disclosure is not limited to this. The display of the selection screen or the like is not essential. Specifically, Step S2, S3 may be removed in the respective processes in FIG. 7 and FIG. 8.

The nip state is switched in three stages among the strong nip state, the middle nip state, and the low nip state in the above embodiment; however, the present disclosure is not limited to this. It is also preferable to switch the nip state in two stages between the strong nip state and the low nip state as well as to switch the nip state in four or more stages among states including the strong nip state and the low nip state.

The present disclosure is applied to the color printer 1 in the above embodiment; however, the present disclosure is not limited to this. The present disclosure may be applied to other image forming apparatuses, for example, a monochrome printer, a copy machine, a multifunction device, and the like.

The configuration in which the second fixing member 82 is moved with respect to the first fixing member 81 is adopted in the above embodiment; however, the present disclosure is not limited to this. It is also preferable to move the first fixing member with respect to the second fixing member.

Any type of heater, which is, for example, a carbon heater can be adopted. A plurality of heaters may be used.

The nip forming member is formed by the pad and the fixing plate in the above embodiment; however, the present disclosure is not limited to this. The nip forming member may be formed, for example, only by the pad.

The second spring 330 and the cam follower 350 are provided in the above embodiment; however, the present disclosure is not limited to this. It is not always necessary to provide the second spring and the cam follower. That is, a configuration in which the arm body can be directly pressed by the cam may be adopted.

The first pad P1 and the second pad P2 are made of rubber in the above embodiment; however, the present disclosure is not limited to this. The pads may be made of, for example, resin or rigid materials such as metal which are not elastically deformed at the time of being pressurized.

Respective components explained in the above embodiment and modification examples may be arbitrarily combined to be achieved.

What is claimed is:

1. An image forming apparatus, comprising:
   a roller;
   a heater configured to heat the roller;
   an endless belt, a sheet being nipped between the endless belt and the roller;
   a nip forming member, the endless belt being nipped between the nip forming member and the roller such that a nip portion is formed;
   a supply roller configured to supply the sheet; and
   a controller configured to:
      supply a plurality of first kind of sheets by the supply roller at a first interval when the plurality of first kind of sheets are sequentially conveyed, the first interval being a sheet interval between an upstream end of a preceding sheet of the plurality of first kind of sheets in a conveying direction of the sheet and a downstream end of a subsequent sheet of the plurality of first kind of sheets in the conveying direction; and
      supply a plurality of second kind of sheets by the supply roller at a second interval greater than the first interval when the plurality of second kind of sheets belonging to a kind in which curl occurs more frequently than the plurality of first kind of sheets are sequentially conveyed, the second interval being a sheet interval between an upstream end of a preceding sheet of the plurality of second kind of sheets in the conveying direction to a downstream end of a subsequent sheet of the plurality of second kind of sheets in the conveying direction,
   wherein, when the sheet is nipped between the roller and the endless belt, the roller contacts with a first surface of the sheet on which an image is formed and an outer circumferential surface of the endless belt contacts with a second surface of the sheet, and
   wherein the nip forming member includes a first pad and a second pad each disposed on an inner circumference side of the endless belt and the second pad is disposed on a downstream side of the first pad in the conveying direction of the sheet.

2. The image forming apparatus according to claim 1, wherein the first interval is smaller than a circumferential length of the endless belt, and
   wherein the second interval is greater than the circumferential length of the endless belt.

3. The image forming apparatus according to claim 1, wherein a first distal end surface that is a surface of the first pad on a roller's side is located nearer to the roller than a second distal end surface that is a surface of the second pad on the roller's side.

4. The image forming apparatus according to claim 3, wherein the first pad is softer than the second pad.

5. The image forming apparatus according to claim 3, wherein the first pad is spaced apart from the pad in the conveying direction of the sheet.

6. The image forming apparatus according to claim 1, wherein the second kind of sheet is thinner in thickness than the first kind of sheet.

7. The image forming apparatus according to claim 1, wherein the second kind of sheet has a smaller basis weight than the first kind of sheet.

8. The image forming apparatus according to claim 1, wherein the controller is configured to set the sheet interval based on kind information indicating a kind of the sheet inputted by a user.

9. The image forming apparatus according to claim 8, wherein the controller is configured to:
   notify the user of information for selecting whether the sheet interval is set to the second interval or not in a case where the kind information is information indicating the second kind of sheet;
   set the sheet interval to the second interval in a case where information indicating that the sheet interval is to be set to the second interval is inputted by the user; and
   set the sheet interval to the first interval in a case where information indicating that the sheet interval is not to be set to the second interval is inputted by the user.

10. The image forming apparatus according to claim 1, wherein the controller is configured to
    set a minimum sheet interval in double-sided printing to the first interval in a case where the double-sided printing is executable and the plurality of first kind of sheets are set to be printed by the double-sided printing, and set the minimum sheet interval in the double-sided printing to the second interval in a case where the double-sided printing is executable and the plurality of second kind of sheets are set to be printed by the double-sided printing.

11. The image forming apparatus according to claim 1, wherein, in the case where the sheet interval is set to the second interval, the controller is configured to set a temperature of the heater to be lower than in the case where the sheet interval is set to the first interval.

12. The image forming apparatus according to claim 1, wherein the roller includes a tube blank and an elastic layer covering an outer circumferential surface of the tube blank, and wherein the second pad is higher than the elastic layer in hardness.

13. The image forming apparatus according to claim 1, further comprising a sliding sheet disposed between the endless belt and the nip forming member, the sliding sheet reducing frictional resistance between the endless belt and the nip forming member.

14. An image forming apparatus, comprising:
a roller;
a heater configured to heat the roller;
an endless belt, a sheet being nipped between the endless belt and the roller;
a nip forming member, the endless belt being nipped between the nip forming member and the roller such that a nip portion is formed;
a supply roller configured to supply the sheet; and
a controller configured to:
set a time interval at which a plurality of first kind of sheets are supplied by the supply roller to a first time interval when the plurality of first kind of sheets are sequentially conveyed; and
set a time interval at which a plurality of second kind of sheets are supplied by the supply roller to a second time interval greater than the first time interval when the plurality of second kind of sheets belonging to a kind in which curl occurs more frequently than the plurality of first kind of sheets are sequentially conveyed,
wherein, when the sheet is nipped between the roller and the endless belt, the roller contacts with a first surface of the sheet on which an image is formed and an outer circumferential surface of the endless belt contacts with a second surface of the sheet, and wherein the nip forming member includes a first pad and a second pad each disposed on an inner circumference side of the endless belt and the second pad is disposed on a downstream side of the first pad in the conveying direction of the sheet.

15. An image forming apparatus, comprising:
a roller;
a heater configured to heat the roller;
an endless belt, a sheet being nipped between the endless belt and the roller;
a nip forming member, the endless belt being nipped between the nip forming member and the roller such that a nip portion is formed;
a supply roller configured to supply the sheet; and
a controller configured to:
supply a plurality of first kind of sheets by the supply roller at a first interval when the plurality of first kind of sheets are sequentially conveyed, the first interval being a sheet interval between an upstream end of a preceding sheet of the plurality of first kind of sheets in a conveying direction of the sheet and a downstream end of a subsequent sheet of the plurality of first kind of sheets in the conveying direction; and
supply a plurality of second kind of sheets by the supply roller at a second interval greater than the first interval when the plurality of second kind of sheets belonging to a kind in which curl occurs more frequently than the plurality of first kind of sheets are sequentially conveyed, the second interval being a sheet interval between an upstream end of a preceding sheet of the plurality of second kind of sheets in the conveying direction to a downstream end of a subsequent sheet of the plurality of second kind of sheets in the conveying direction,
wherein the first interval is smaller than a circumferential length of the endless belt,
wherein the second interval is greater than the circumferential length of the endless belt,
wherein, when the sheet is nipped between the roller and the endless belt, the roller contacts with a first surface of the sheet on which an image is formed and an outer circumferential surface of the endless belt contacts with a second surface of the sheet, and
wherein the nip forming member includes a first nip forming member and a second nip forming member each disposed on an inner circumference side of the endless belt.

* * * * *